United States Patent
Matsuo et al.

(10) Patent No.: US 10,014,525 B2
(45) Date of Patent: Jul. 3, 2018

(54) BINDER FOR BATTERY ELECTRODE, AND ELECTRODE AND BATTERY USING SAME

(71) Applicant: OSAKA SODA CO., LTD., Osaka (JP)

(72) Inventors: Takashi Matsuo, Osaka (JP); Tomoyuki Yano, Osaka (JP); Yasushi Miki, Osaka (JP); Katsuhito Miura, Osaka (JP)

(73) Assignee: OSAKA SODA CO., LTD., Osaka (JP)

( * ) Notice: Subject to any disclaimer, the term of this patent is extended or adjusted under 35 U.S.C. 154(b) by 173 days.

(21) Appl. No.: 14/762,982

(22) PCT Filed: Jan. 24, 2014

(86) PCT No.: PCT/JP2014/051487
§ 371 (c)(1),
(2) Date: Jul. 23, 2015

(87) PCT Pub. No.: WO2014/119481
PCT Pub. Date: Aug. 7, 2014

(65) Prior Publication Data
US 2015/0372305 A1    Dec. 24, 2015

(30) Foreign Application Priority Data

Jan. 29, 2013 (JP) ................... 2013-014057
Mar. 29, 2013 (JP) ................... 2013-071439

(51) Int. Cl.
*H01M 4/62* (2006.01)
*C08F 290/06* (2006.01)
*C08F 222/30* (2006.01)
*C08F 220/28* (2006.01)
*H01M 10/0525* (2010.01)

(52) U.S. Cl.
CPC ........... *H01M 4/622* (2013.01); *C08F 220/28* (2013.01); *C08F 222/30* (2013.01); *C08F 290/062* (2013.01); *H01M 10/0525* (2013.01); *H01M 2220/10* (2013.01); *H01M 2220/20* (2013.01); *H01M 2220/30* (2013.01)

(58) Field of Classification Search
CPC .................................. H01M 10/052
USPC ...................... 525/329.7; 526/271
See application file for complete search history.

(56) References Cited

U.S. PATENT DOCUMENTS

| | | |
|---|---|---|
| 6,881,517 B1 | 4/2005 | Kanzaki et al. |
| 8,513,349 B2 | 8/2013 | Ootsuka et al. |
| 2002/0122985 A1 | 9/2002 | Sato et al. |
| 2012/0309892 A1 | 12/2012 | Ootsuka et al. |
| 2015/0137030 A1 | 5/2015 | Matsuo et al. |

FOREIGN PATENT DOCUMENTS

| | | | |
|---|---|---|---|
| JP | 2001-76731 | 3/2001 | |
| JP | 2001-256980 | 9/2001 | |
| JP | 2002-289174 | 10/2002 | |
| JP | 2003-268053 | 9/2003 | |
| JP | 2006-260782 | 9/2006 | |
| JP | 2011-108373 | 6/2011 | |
| JP | 2012-51999 | 3/2012 | |
| JP | 2013-105676 | 5/2013 | |
| WO | 2011/148970 | 12/2011 | |
| WO | WO 2011/148970 | * 12/2011 | .......... H01M 10/052 |
| WO | 2012/133031 | 10/2012 | |
| WO | 2012/169094 | 12/2012 | |
| WO | 2013/180103 | 12/2013 | |

OTHER PUBLICATIONS

International Preliminary Report on Patentability and Written Opinion of the International Searching Authority dated Aug. 4, 2015 in corresponding International Application No. PCT/JP2014/051487 (with English translation).
International Search Report dated Apr. 28, 2014 in International (PCT) Application No. PCT/JP2014/051487.

\* cited by examiner

*Primary Examiner* — Khanh T Nguyen
(74) *Attorney, Agent, or Firm* — Wenderoth, Lind & Ponack, L.L.P.

(57) ABSTRACT

This binder for battery electrodes is characterized by containing a polymer including: (A) a structural unit represented by general formula (1) and derived from a monomer having a hydroxyl group

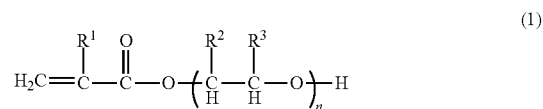

(1)

(in the formula, R1 is a hydrogen or a C1-C4 straight-chain or branched alkyl group, R2 and R3 are each a hydrogen or a C1-C4 straight-chained or branched alkyl group, and n is an integer of 2-30); (B) a structural unit derived from an ethylenically unsaturated monomer having at least one functional group selected from the group consisting of a difunctional carboxylic acid group, a nitrile group and a ketone group; and (C) a structural unit derived from a polyfunctional (meth)acrylate monomer having at most five functional groups.

15 Claims, No Drawings

BINDER FOR BATTERY ELECTRODE, AND ELECTRODE AND BATTERY USING SAME

TECHNICAL FIELD

The present invention relates to a binder used for an electrode of a battery, the electrode manufactured by using said binder, and the battery manufactured by using said electrode. Herein, the battery includes an electrochemical capacitor and is a primary battery or a secondary battery. Examples of the battery are a lithium-ion secondary battery, and a nickel hydrogen secondary battery.

BACKGROUND ART

The use of a binder is known in an electrode of a battery. Representative examples of the battery having the electrode comprising the binder include a lithium-ion secondary battery.

Since the lithium-ion secondary battery has a high energy density and a high voltage, the lithium-ion secondary battery is used for electronic apparatuses, such as a mobile phone, a laptop computer and a camcorder. Recently, because of a rise of consciousness to environmental protection, and enactment of related laws, the application in vehicles, such as an electric vehicle and a hybrid electric vehicle, and the application of a storage battery in electric power storage for home are also progressing.

The lithium-ion secondary battery generally comprises a negative electrode, a positive electrode, a separator, a liquid electrolyte, and an electrical collector. With respect to the electrode, the negative electrode is obtained by applying a coating liquid which comprises a negative electrode active material, such as graphite and hard carbon capable of intercalating and deintercalating a lithium ion, an electrically conductive additive, a binder, and a solvent onto an electrical collector represented by a copper foil, and drying the coating liquid. Recently, a dispersion comprising a styrene-butadiene rubber (abbreviated as "SBR" hereafter) dispersed in water is generally used as the binder.

On the other hand, the positive electrode is produced by mixing a positive electrode active material such as lithium cobalt oxide and spinel-type lithium manganese oxide, an electrically conductive additive such as carbon black, and a binder such as polyvinylidene fluoride and polytetrafluoroethylene, dispersing them in a polar solvent such as N-methylpyrrolidone to prepare a coating liquid, then coating the coating liquid, as in the negative electrode, on an electrical collector foil represented by aluminum foil, and drying the coating liquid.

These binders for lithium-ion batteries need to increase the addition amount of the binder, in order to secure the bindability (bondability), thereby causing the deterioration of the performances which is a problem of these binders. Since N-methylpyrrolidone is used for the slurry solvent, an aqueous binder is required from a viewpoint of a recovery, a cost, toxicity and an environmental load. However, the use of a SBR-base binder, which is an aqueous binder, has the problem that oxidization degradation is caused under a positive electrode environment. Therefore, the binders comprising polyvinylidene fluoride and/or polytetrafluoroethylene dispersed in N-methylpyrrolidone as a dispersing solvent are still used as the binder of the positive electrode. Urgently required is the development of the binder which is excellent in the bindability between an electrical collector and an active material, and between active materials, has a low environmental load, is an aqueous binder, and is suitable for manufacture of the electrode for secondary batteries having high oxidation resistance.

In order to solve the above-mentioned problems, Patent Documents 1 and 2 propose that a binder composition comprising an aromatic vinyl, a conjugated diene and an ethylenically unsaturated carboxylate ester, and a binder composition comprising a styrene butadiene polymer latex and an acrylic polymer latex, as aqueous binder components, are used to prepare a positive electrode and/or a negative electrode, whereby giving the improved bindability and battery performance. However, when these binders are used for a positive electrode, there is a concerned problem in oxidation resistance to possibly worse the battery properties. Patent Document 3 proposes the use of a binder composition comprising a nitrile group-containing monomer as aqueous binder components. However, an object of Patent Document 3 is mainly to increase a thickening property at the time of producing a negative electrode, and particularly when used in a positive electrode, a problematic durability of a battery might be possibly caused.

Patent Document 4 proposes that a binding property and a battery performance are improved by producing a positive electrode and/or a negative electrode by using a binder composition comprising a carboxy-modified styrene/butadiene copolymer. However, when these binders are used for an electrode (a positive electrode and/or a negative electrode), the charge/discharge cycle property is deteriorated under a high temperature environment. Especially when used for a positive electrode, there is a concerned problem in oxidation resistance under high-voltage conditions to possibly worse the battery properties.

PRIOR ART DOCUMENTS

Patent Documents

Patent Document 1: JP 2001-076731A
Patent Document 2: JP 2006-260782A
Patent Document 3: JP 2012-51999A
Patent Document 4: JP 2011-108373A

SUMMARY OF INVENTION

Problems to be Solved by the Invention

The present invention has been made in view of the above-mentioned circumstances. An object of the present invention is to provide an aqueous binder composition, and an electrode and a battery comprising the aqueous binder composition, wherein the bindability is high, the dispersibility is excellent, the oxidation degradation is not caused under a positive electrode high voltage, and the environmental load is small.

Means for Solving the Problems

The inventors intensively studied to achieve the above-mentioned object, discovered that the above-mentioned objects are achieved by using a binder composition comprising a polymer comprising constitutional units derived from a monomer having a hydroxyl group, constitutional units derived from an ethylenically unsaturated monomer having a nitrile group, a difunctional carboxylic acid group or a ketone group and constitutional units derived from a polyfunctional (meth)acrylate monomer, and then completed the present invention. That is, the present invention relates to the followings:

[1] A binder for battery electrode, comprising a polymer comprising:
(A) constitutional units derived from a monomer having a hydroxyl group, represented by the general formula (1):

[Formula 1]

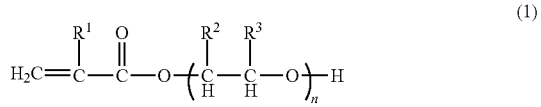

wherein
$R^1$ is hydrogen, or a linear or branched alkyl group having 1 to 4 carbon atoms,
$R^2$ and $R^3$ each is hydrogen, or a linear or branched alkyl group having 1 to 4 carbon atoms, and
n is an integer of 2 to 30,
(B) constitutional units derived from an ethylenically unsaturated monomer having at least one functional group selected from the group consisting of a difunctional carboxylic acid group, a nitrile group and a ketone group, and
(C) constitutional units derived from a polyfunctional (meth)acrylate monomer having penta- or less functionality.
[2] The binder for battery electrode according to [1], wherein n is an integer of 4 to 20, in the formula (1).
[3] The binder for battery electrode according to [1] or [2], wherein the functional group-containing ethylenically unsaturated monomer (B) is a compound represented by the formula:

wherein
$A^1$ is a group having a nitrile group (—CN group), a carboxylic acid group (—COOH group) or a ketone group (>C=O group),
$A^2$ and $A^3$ each is, the same or different, a hydrogen atom, a halogen atom, an alkyl group having 1-6 carbon atoms, or a group having a nitrile group (—CN group) or a carboxylic acid group (—COOH group),
$A^4$ is a hydrogen atom, a halogen atom, or an alkyl group having 1-6 carbon atoms, and
$A^1$ and $A^2$, or $A^1$ and $A^3$ may be joined together to form a cyclic hydrocarbon group having two carboxylic acid groups.
[4] The binder for battery electrode according to any one of [1] to [3], wherein the group having a nitrile group (—CN group) is a —$B^2$—CN group wherein $B^2$ is a direct bond or an alkylene group having 1-6 carbon atoms,
the group having a difunctional carboxylic acid group (—COOH group) (dicarboxylic acid group) is a —$B^1$—COOH group wherein $B^1$ is a direct bond or an alkylene group having 1-6 carbon atoms, and
the group having a ketone group (>C=O group) is a —$B^3$—CO—$B^4$ group wherein $B^3$ is a direct bond or an alkylene group having 1-6 carbon atoms, and $B^4$ is an alkyl group having 1-6 carbon atoms.
[5] The binder for battery electrode according to any one of [1] to [4], wherein the ethylenically unsaturated monomer having a nitrile group (—CN group) is a compound represented by the formula:

(CN—)($X^{11}$—)C=C(—$X^{12}$)(—$X^{13}$)

wherein
$X^{11}$ is a hydrogen atom, an alkyl group having 1-6 carbon atoms, a halogen atom or a cyano group,
$X^{12}$ is a hydrogen atom, an alkyl group having 1-6 carbon atoms or a cyano group, and
$X^{13}$ is a hydrogen atom, an alkyl group having 1-6 carbon atoms or a halogen atom.
[6] The binder for battery electrode according to any one of [1] to [4], wherein the ethylenically unsaturated monomer having a difunctional carboxylic acid group is a compound represented by the formula:

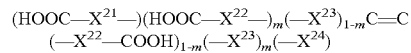

wherein
$X^{21}$ and $X^{22}$ each is, the same or different, a direct bond or an alkylene group having 1-6 carbon atoms,
$X^{23}$ and $X^{24}$ each is, the same or different, a hydrogen atom, an alkyl group having 1-6 carbon atoms or a halogen atom, and
m is 0 or 1.
[7] The binder for battery electrode according to any one of [1] to [4], wherein the ethylenically unsaturated monomer having a ketone group is a compound represented by the formula:

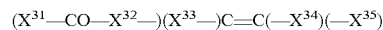

wherein
$X^{31}$, $X^{33}$, $X^{34}$ and $X^{35}$ each is, the same or different, a hydrogen atom, an alkyl group having 1-6 carbon atoms or a halogen atom, and
$X^{32}$ is a direct bond or an alkylene group having 1-6 carbon atoms.
[8] The binder for battery electrode according to any one of claims [1] to [7], wherein the polyfunctional (meth)acrylate monomer (C) is a compound represented by the formula:

[Formula 2]

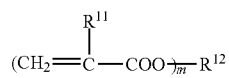

wherein
$R^{11}$ each is, the same or different, hydrogen or a methyl group,
$R^{12}$ is a penta- or less valent organic group having 2 to 100 carbon atoms, and
m is an integer less than or equal to 5.
[9] The binder for battery electrode according to any one of [1] to [8], wherein the polyfunctional (meth)acrylate (C) is a (meth)acrylate having tri-functionality to penta-functionality.
[10] The binder for battery electrodes according to any one of [1] to [9], wherein the polymer further comprises one or both of the constitutional units (D) derived from a (meth)acrylate ester monomer and constitutional units (E) derived from a (meth)acrylic acid monomer.
[11] The binder for battery electrode according to [10], wherein the (meth)acrylate ester monomer (D) is a compound represented by the formula:

[Formula 3]

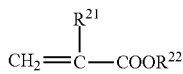
(4)

wherein
$R^{21}$ is hydrogen or a methyl group, and
$R^{22}$ is a hydrocarbon group having 1 to 50 carbon atoms.
[12] The binder for battery electrode according to [10], wherein the (meth)acrylic acid monomer (E) is a compound represented by the formula:

[Formula 4]

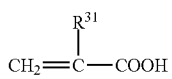
(5)

wherein $R^{31}$ is hydrogen or a methyl group.
[13] The binder for battery electrode according to any one of [1] to [12], wherein the amounts of the constitutional units (A), the constitutional units (B), the constitutional units (C), the constitutional units (D) and the constitutional units (E) in the polymer are 1 to 500 parts by weight of the constitutional units (B), 0.5 to 100 parts by weight of the constitutional units (C), and 0 to 500 parts by weight of the constitutional units (D), and 0 to 100 parts by weight of the constitutional units (E), based on 100 parts by weight of the constitutional units (A).
[14] The binder for battery electrode according to any one of [1] to [13], wherein the battery is a secondary battery.
[15] A battery electrode comprising the binder according to any one of [1] to [14], and an active material.
[16] A battery comprising the electrode according to [15].

Effects of the Invention

The binder of the present invention can give a strong bond between the active materials and the electrically conductive additive and the electrode is excellent in bindability to an electrical collector. The excellent bindability (strong adherence) is considered to be caused by the matters that surface areas of the particulates of the polymer dispersed in water are large and the constitutional units derived from the monomer having a hydroxyl group are used.

The binder of the present invention provides the electrode which is excellent in flexibility (bendability).

The dissolution of the binder in an electrolyte solution is restrained, and the binder of the present invention is not substantially dissolved in the electrolyte solution. This nondissolution of the binder is considered for the binder to have a highly crosslinked structure prepared by using the constitutional units derived from the polyfunctional (meth)acrylate monomer as a crosslinking agent component.

The present invention can provide a battery, especially a secondary battery, having a high capacity and a long battery life. The secondary battery is excellent in the charge/discharge cycle properties. Particularly, the secondary battery has excellent long-term cycle life and excellent cycle charge/discharge properties at a high temperature (for example, 60° C.).

The secondary battery of the present invention can be used at a high voltage and has excellent heat-resistance.

Since the binder is aqueous or water-based (that is, a solvent is water), the binder of the present invention has a low environmental load and does not need an apparatus of recovering an organic solvent.

MODES FOR CARRYING OUT THE INVENTION

The binder of the present invention is characterized in that the binder comprises a polymer comprising:
(A) constitutional units derived from a monomer having a hydroxyl group, represented by the general formula (1)

[Formula 5]

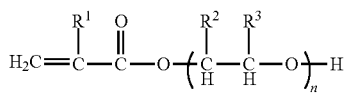
(1)

wherein
$R^1$ is hydrogen, or a linear or branched alkyl group having 1 to 4 carbon atoms,
$R^2$ and $R^3$ each is hydrogen, or a linear or branched alkyl group having 1 to 4 carbon atoms, and
n is an integer of 2 to 30,
(B) constitutional units derived from an ethylenically unsaturated monomer having at least one functional group selected from the group consisting of a difunctional carboxylic acid group, a nitrile group and a ketone group, and
(C) constitutional units derived from a polyfunctional (meth)acrylate monomer having penta- or less functionality.

The constitutional units of the polymer of the present invention are explained below in detail.

In the general formula (1) of the monomer having a hydroxyl group (A), $R^1$ is hydrogen, or a linear or branched an alkyl group having 1 to 4 carbon atoms, $R^2$ and $R^3$ each is selected from hydrogen, or a linear or branched alkyl group having 1 to 4 carbon atoms. Examples of $R^1$ include hydrogen, and a methyl, ethyl, propyl, isopropyl, n-butyl or isobutyl group. Preferably, $R^1$ is hydrogen or a methyl group. That is, the monomer having a hydroxyl group (A) is preferably a (meth)acrylate monomer wherein $R^1$ is hydrogen or a methyl group. Examples of $R^2$ and $R^3$ include hydrogen, and a methyl, ethyl, propyl, isopropyl, n-butyl and isobutyl group. Preferably, $R^2$ and $R^3$ are hydrogen or a methyl group. n is an integer of 2 to 30. Preferably, n is an integer of 3 to 25, more preferably an integer of 4 to 20.

Specific examples of the monomer having a hydroxyl group (A) include diethylene glycol mono(meth)acrylate, triethylene glycol mono(meth)acrylate, tetraethylene glycol mono(meth)acrylate, polyethylene glycol mono(meth)acrylate, dipropylene glycol mono(meth)acrylate, tripropylene glycol mono(meth)acrylate, tetrapropylene glycol mono(meth)acrylate, and polypropylene glycol mono(meth)acrylate. These can be used alone or in combination of at least two. Among them, tetraethylene glycol mono(meth)acrylate, polyethylene glycol mono(meth)acrylate, tetrapropylene glycol mono(meth)acrylate, and polypropylene glycol mono(meth)acrylate are preferable.

The functional group-containing ethylenically unsaturated monomer (B) has at least one functional group. The functional group is a nitrile group, a difunctional carboxylic acid group (a dicarboxylic acid group or a carboxylic anhydride group) or a ketone group. The dicarboxylic acid groups may be joined together to form the carboxylic anhydride group.

Preferably, the functional group-containing ethylenically unsaturated monomer (B) is a compound represented by the formula:

$$(A^1-)(A^2-)C=C(-A^3)(-A^4) \quad (2)$$

wherein $A^1$ is a group having a nitrile group (—CN group), a carboxylic acid group (—COOH group) or a ketone group (>C=O group), $A^2$ and $A^3$ each is, the same or different, a hydrogen atom, a halogen atom, an alkyl group having 1-6 carbon atoms, or a group having a nitrile group (—CN group) or a carboxylic acid group (—COOH group), $A^4$ is a hydrogen atom, a halogen atom, or an alkyl group having 1-6 carbon atoms, and $A^1$ and $A^2$, or $A^1$ and $A^3$ may be joined together to form a cyclic hydrocarbon group having two carboxylic acid groups.

Herein, the "ketone group" means a group other than a carboxylic acid group and —C(=O)—O—.

Preferably, the group having a nitrile group (—CN group) is a —$B^1$—CN group wherein $B^1$ is a direct bond or an alkylene group having 1-6 carbon atoms.

Preferably, the group having a difunctional carboxylic acid group (—COOH group) (dicarboxylic acid group) is a —$B^2$—COOH group wherein $B^2$ is a direct bond or an alkylene group having 1-6 carbon atoms.

Preferably, the group having a ketone group (>C=O group) is a —$B^3$—CO—$B^4$ group wherein $B^3$ is a direct bond or an alkylene group having 1-6 carbon atoms, and $B^4$ is an alkyl group having 1-6 carbon atoms.

$A^1$ and $A^2$, or $A^1$ and $A^3$ may be joined together to form a cyclic hydrocarbon group having two carboxylic acid groups. In $A^1$ and $A^2$, or $A^1$ and $A^3$, the cyclic hydrocarbon group may directly or indirectly bond to two carboxylic acid groups. The cyclic hydrocarbon group may be a 4- to 10-membered ring, is preferably a 6-membered ring, and may be cycloalkylene group having one ethylenically unsaturated double bond. The cyclic hydrocarbon group may have an epoxy linkage.

Preferably, in the functional group-containing ethylenically unsaturated monomer (B), the number of nitrile groups is 1 or 2. Preferably, in the functional group-containing ethylenically unsaturated monomer (B), the number of carboxylic acid groups is 2, and the number of carboxylic anhydride groups is 1. Preferably, in the functional group-containing ethylenically unsaturated monomer (B), the number of ketone groups is 1.

Herein, examples of the halogen atom are a fluorine atom, a chlorine atom, a bromine atom and an iodine atom, and the halogen atom is preferably the chlorine atom.

Preferably, the ethylenically unsaturated monomer having a nitrile group (—CN group) is a compound represented by the formula:

$$(CN-)(X^{11}-)C=C(-X^{12})(-X^{13})$$

wherein $X^{11}$ is a hydrogen atom, an alkyl group having 1-6 carbon atoms, a halogen atom or a cyano group, $X^{12}$ is a hydrogen atom, an alkyl group having 1-6 carbon atoms or a cyano group, and $X^{13}$ is a hydrogen atom, an alkyl group having 1-6 carbon atoms or a halogen atom.

The nitrile group-containing ethylenically unsaturated monomer is not especially limited, insofar as the nitrile group is contained. Preferably, as the nitrile group-containing ethylenically unsaturated monomers, used are alpha, beta-unsaturated nitrile monomers, such as acrylonitrile, methacrylonitrile, alpha-chloro acrylonitrile, crotononitrile, alpha-ethylacrylonitrile, vinylidene cyanide and fumaronitrile. More preferable are acrylonitrile and methacrylonitrile. These may be used alone or in combination of at least two.

Preferably, the ethylenically unsaturated monomer having a difunctional carboxylic acid group is a compound represented by the formula:

$$(HOOC-X^{21}-)(HOOC-X^{22}-)_m(-X^{23})_{1-m}C=C\\(-X^{22}-COOH)_{1-m}(-X^{23})_m(-X^{24})$$

wherein $X^{21}$ and $X^{22}$ each is, the same or different, a direct bond or an alkylene group having 1-6 carbon atoms, $X^{23}$ and $X^{24}$ each is, the same or different, a hydrogen atom, an alkyl group having 1-6 carbon atoms or a halogen atom, and m is 0 or 1.

Examples of the ethylenically unsaturated monomer having a difunctional carboxylic acid group include fumaric acid, maleic acid, itaconic acid, citraconic acid, mesaconic acid, glutaconic acid, 1,2,3,6-tetrahydrophthalic acid, 3-methyl-1,2,3,6-tetrahydrophthalic acid, 4-methyl-1,2,3,6-tetrahydrophthalic acid, methyl-3,6-endomethylene-1,2,3,6-tetrahydrophthalic acid, exo-3,6-epoxy-1,2,3,6-tetrahydrophthalic acid and himic acid. Anhydrides of the above-mentioned unsaturated dicarboxylic acid, such as maleic anhydride can be used, and saponification products of these anhydrides may be used. (Herein, the "the ethylenically unsaturated monomer having a difunctional carboxylic acid group" collectively includes a free acid, an anhydride, and a salt and saponification product thereof.) Preferably, the ethylenically unsaturated monomer having a difunctional carboxylic acid group is fumaric acid, maleic acid and itaconic acid. More preferable is itaconic acid. These may be used alone or in combination of at least two.

Preferably, the ethylenically unsaturated monomer having a ketone group is a compound represented by the formula:

$$(X^{31}-CO-X^{32}-)(X^{33}-)C=C(-X^{34})(-X^{35})$$

wherein $X^{31}$, $X^{33}$, $X^{34}$ and $X^{35}$ each is, the same or different, a hydrogen atom, an alkyl group having 1-6 carbon atoms or a halogen atom, and $X^{32}$ is a direct bond or an alkylene group having 1-6 carbon atoms.

Preferably, at least one, particularly all of $X^{33}$, $X^{34}$ and $X^{35}$ are hydrogen atoms. $X^{32}$ is preferably a direct bond.

Examples of the ethylenically unsaturated monomer (B) having a ketone group include vinyl ketones, such as methyl vinyl ketone, ethyl vinyl ketone, isopropyl vinyl ketone, isobutyl vinyl ketone, t-butyl vinyl ketone, and hexyl vinyl ketone. These may be used alone or in combination of at least two.

The polyfunctional (meth)acrylate monomer (C) acts as a crosslinking agent. The polyfunctional (meth)acrylate monomer (C) may be a difunctional to pentafunctional (especially, trifunctional to pentafunctional) (meth)acrylate. The polyfunctional (meth)acrylate monomers (B) is preferably a trifunctional or tetrafunctional (meth)acrylate. If the (meth)acrylate is hexa- or more functional, a viscosity of the crosslinking agent itself becomes high, the crosslinking agent cannot be dispersed well during an emulsion polymerization, and the physical properties (such as flexibility (bendability) and bindability) of the binder are deteriorated.

The polyfunctional (meth)acrylate monomer (C) is preferably a compound represented by the formula:

[Formula 6]

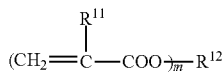

(3)

wherein $R^{11}$ each is, the same or different, hydrogen or a methyl group, $R^{12}$ is a penta- or less valent organic group having 2 to 100 carbon atoms, and m is an integer less than or equal to 5.

Preferably, $R^{12}$ is a divalent to pentavalent organic group, and m is an integer of 2 to 5. More preferably, $R^{12}$ is a trivalent to pentavalent, especially trivalent to tetravalent organic group, and m is an integer of 3 to 5, especially an integer of 3 to 4.

$R^{12}$ may be a hydrocarbon group, an oxyalkylene group (—O-$A^1$)- wherein $A^1$ is an alkylene group having 2 to 4 carbon atoms), a polyoxyalkylene group (—(O-$A^2$)$_p$- wherein $A^2$ is an alkylene group having 2 to 4 carbon atoms, and p is from 2 to 30), or at least two of these may be included simultaneously. $R^{12}$ may contain a substituent group. Examples of the substituent group include a hydroxyl group, a carboxylic acid group, a nitrile group, a fluorine atom, an amino group, a sulfonic group, a phosphate group, an amide group, an isocyanurate group, an oxyalkylene group (—(O-$A^3$)-H wherein $A^3$ is an alkylene group having 2 to 4 carbon atoms), a polyoxyalkylene group (—(O-$A^4$)$_q$-H wherein $A^4$ is an alkylene group having 2 to 4 carbon atoms, and q is from 2 to 30), an alkoxyoxyalkylene group (-($A^5$-O)—$B^1$ wherein $A^5$ is an alkylene group having 2 to 4 carbon atoms and $B^1$ is an alkyl group having 1 to 4 carbon atoms), an alkoxypolyoxyalkylene group (-($A^6$-O)$_r$—$B^2$ wherein $A^6$ is an alkylene group having 2 to 4 carbon atoms, r is from 1 to 30, and $B^2$ is an alkyl group having 1 to 4 carbon atoms).

In the $R^{12}$ group, the hydrocarbon group may be linear or branched hydrocarbon group, and the hydrocarbon group is preferably a branched hydrocarbon group. The number of carbon atoms in the hydrocarbon group is from 2 to 100, for example, from 3 to 50, especially from 4 to 30.

Specific examples of the difunctional (meth)acrylate include triethylene glycol di(meth)acrylate, tetraethylene glycol di(meth)acrylate, polyethylene glycol di(meth)acrylate, tripropyleneglycol di(meth)acrylate, tetrapropylene glycol di(meth)acrylate, polypropyleneglycol di(meth)acrylate, polytetramethylene glycol di(meth)acrylate, dioxane glycol di(meth)acrylate, and bis(meth)acryloyloxyethyl phosphate.

Specific examples of the trifunctional (meth)acrylate include trimethylolpropane tri(meth)acrylate, trimethylolpropane EO-added tri(meth)acrylate, pentaerythritol tri(meth)acrylate, 2,2,2-tris(meth)acryloyloxy methylethyl succinate, ethoxylated isocyanuric acid tri(meth)acrylate, epsilon-caprolactone-modified tris(2-(meth)acryloxyethyl) isocyanurate, glycerol EO-added tri(meth)acrylate, glycerol PO-added tri(meth)acrylate, and tris(meth)acryloyloxyethyl phosphate. Among them, trimethylolpropane tri(meth)acrylate, trimethylolpropane EO-added tri(meth)acrylate, and pentaerythritol tri(meth)acrylate are preferable.

Specific examples of the tetrafunctional (meth)acrylate include ditrimethylolpropane tetra(meth)acrylate, pentaerythritol tetra(meth)acrylate, and pentaerythritol EO-added tetra(meth)acrylate.

Specific examples of the pentafunctional (meth)acrylate include dipentaerythritol penta(meth)acrylate.

The polyfunctional (meth)acrylate may be one or a combination of at least two.

In the present invention, each of the monomers (A) to (E) may be used alone or in combination of at least two.

The polymer of the present invention may comprise, in addition to the constitutional units (A) derived from the monomer having a hydroxyl group represented by the general formula (1), the constitutional units (B) derived from the functional group-containing ethylenically unsaturated monomer and the constitutional units (C) derived from the polyfunctional (meth)acrylate monomer, one or both of constitutional units (D) derived from a (meth)acrylate ester monomer, and constitutional units (E) derived from a (meth)acrylic acid monomer.

That is, the polymer of the present invention may have the following constitutional units:

Constitutional units (A)+(B)+(C),

Constitutional units (A)+(B)+(C)+(D),

Constitutional units (A)+(B)+(C)+(E), or

Constitutional units (A)+(B)+(C)+(D)+(E).

Preferably, the (meth)acrylate ester monomer (D) is a compound represented by the formula:

[Formula 7]

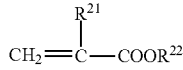

(4)

wherein $R^{21}$ is hydrogen or a methyl group, and $R^{22}$ is a hydrocarbon group having 1 to 50 carbon atoms.

$R^{22}$ is a monovalent organic group and may be a saturated or unsaturated aliphatic group (for example, a chained aliphatic group or a cyclic aliphatic group), an aromatic group, or an araliphatic group. Preferably, $R^{22}$ is a saturated hydrocarbon group, especially a saturated aliphatic group. Particularly preferably, $R^{22}$ is a branched or linear alkyl group. The number of carbon atoms in $R^{22}$ is from 1 to 50, for example, from 1 to 30, especially from 1 to 20.

Specific examples of the (meth)acrylate ester monomer constituting the constitutional units (D) include alkyl (meth)acrylate esters such as methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, iso-amyl (meth)acrylate, n-hexyl (meth)acrylate, 2-ethylhexyl (meth)acrylate and lauryl (meth)acrylate. Preferably, the (meth)acrylate ester monomer is methyl (meth)acrylate, ethyl (meth)acrylate, propyl (meth)acrylate, and isopropyl (meth)acrylate. The (meth)acrylate ester monomer may be used alone or in a combination of at least two.

The (meth)acrylic acid monomer (E) is preferably a compound represented by the formula:

[Formula 7]

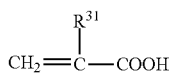

(4)

wherein $R^{31}$ is hydrogen or a methyl group.

Examples of (meth)acrylic acid monomer constituting the constitutional units (E) include methacrylic acid and acrylic acid, and may be used alone or in a combination of at least two. A combination of methacrylic acid and acrylic acid may be used, wherein methacrylic acid and acrylic acid are in a weight ratio of 1:99-99:1, for example, 5:95-95:5, especially 20:80-80:20.

Another monomer which is other than the monomers (A), (B), (C), (D) and (E), for example, a vinyl monomer may be used. Examples of the vinyl monomer include monomers which are a gas at a standard condition, such as ethylene, propylene and vinyl chloride, and monomers which are a liquid or solid at a standard condition, particularly (meth)acrylic monomers other than the monomers (A), (B), (C), (D) and (E), for example, (meth)acrylic monomers having a substituent group such as a hydroxyl group, an amide group, a fluorine atom and a sulfonic acid group.

Preferably, in the present invention, the used monomers (namely the monomers (A), (B), (C), (D) and (E), and the other monomer(s)) do not have a carbon-carbon double bond (and a carbon-carbon triple bond) including an aromatic carbon-carbon double bond, in addition to an ethylenically unsaturated double bond contained in the (meth)acrylic group.

In the polymer, a ratio of the constitutional units (A) derived from the monomer having a hydroxyl group, the constitutional units (B) derived from the functional ethylenically unsaturated monomer, the constitutional units (C) derived from the polyfunctional (meth)acrylate monomer which is an crosslinking agent, the constitutional units (D) derived from the (meth)acrylate ester monomer, and the constitutional units (E) derived from the (meth)acrylic acid monomer may be:
(A) 1 to 89.9% by weight, (B) 40-10% by weight, (C) 20-0.1% by weight, (D) 29-0% by weight, and (E) 10-0% by weight;
preferably (A) 10 to 80% by weight, (B) 40-15% by weight, (C) 15-0.5% by weight, (D) 25-0% by weight, and (E) 10-4.5% by weight; and
more preferably (A) 15 to 80% by weight, (B) 40-15% by weight, (C) 15-0.5% by weight, (D) 20-0% by weight, and (E) 10-4.5% by weight; or
(A) 10-98.9% by weight, (B) 20-1% by weight, (C) 25-0.1% by weight, (D) 60-0% by weight, and (E) 15-0% by weight; preferably (A) 15-92.5% by weight, (B) 18-2% by weight, (C) 22-0.5% by weight, (D) 49-5% by weight, and (E) 12-0% by weight; and
more preferably (A) 20-86% by weight, (B) 16-3% by weight, (C) 20-1% by weight, (D) 49-10% by weight, and (E) 10-0% by weight.

Alternatively, in the polymer, amounts of the constitutional units (A) derived from the monomer having a hydroxyl group, the constitutional units (B) derived from the functional ethylenically unsaturated monomer, the constitutional units (C) derived from the polyfunctional (meth)acrylate monomer, the constitutional units (D) derived from the (meth)acrylate ester monomer, and the constitutional units (E) derived from the (meth)acrylic acid monomer may be:
Constitutional units (B) 1 to 500 parts by weight, preferably 2 to 300 parts by weight, more preferably 3 to 200 parts by weight,
Constitutional units (C) 0.5 to 100 parts by weight, preferably 1 to 90 parts by weight, more preferably 2 to 80 parts by weight,
Constitutional units (D) 0 to 500 parts by weight, preferably 1 to 400 parts by weight, more preferably 2 to 300 parts by weight, and
Constitutional units (E) 0 to 100 parts by weight, preferably 0.5 to 80 parts by weight, more preferably 1 to 50 parts by weight,
based on 100 parts by weight of the constitutional units (A).

Examples of a method of preparing the polymer of the present invention include a general emulsion polymerization method, a soap free emulsion polymerization method, a seed polymerization method, and a method of conducting a polymerization after swelling a monomer, etc. into seed particles. Specifically, in a closed container equipped with an agitator and a heating device, a composition comprising a monomer, an emulsifier, a polymerization initiator, water, and optionally a dispersing agent, a chain transfer agent and a pH adjuster is stirred at a room temperature under an inert gas atmosphere to emulsify the monomer in water. The emulsification method includes a stirring method, a shearing method and an ultrasonic wave method, and can use a stirring blade and a homogenizer. Subsequently, the initiation of the polymerization with stirring to raise the temperature can give a latex of a spherical-shaped polymer wherein the polymer is dispersed in water. Alternatively, it is possible to use a dispersion dispersed in an organic solvent such as N-methyl pyrrolidone, after the produced spherical-shaped polymer is isolated. Further, a monomer, an emulsifier, a dispersing agent, etc. are used again and dispersed in water to obtain a latex of the polymer. A method of adding the monomer at the polymerization include a one-package charge method, a method of dropping the monomer and a pre-emulsion dropping method, and these method may be used in combination of at least two.

The particle structure of the polymer in the binder of the present invention is not particularly limited. For example, the present invention can use a latex of the polymer comprising the complex polymer particles of core/shell structure produced by a seed polymerization. For example, a method described in "Chemistry of dispersion/emulsification system" (published by Kougakutosho Co., Ltd.) can be used for the seed polymerization method. Specifically, this method is that the monomer, the polymerization initiator and the emulsifier are added into a system dispersing the seed particles produced by the above-mentioned method, and nuclear particles are grown, and the above-mentioned method may be repeated once or more.

In the seed polymerization, the particles comprising the polymer of the present invention or a conventionally known polymer may be used. Examples of the conventionally known polymer include polyethylene, polypropylene, polyvinyl alcohol, polystyrene, poly(meth)acrylate and polyether. The conventionally known polymer is not limited to the above-mentioned examples, and another conventionally known polymer can be used. A homopolymer, or a copolymer or a blend may be used.

Examples of a particle shape of the polymer in the binder of the present invention include a platelet structure, a hollow structure, a composite structure, a localized structure, a Daruma-shaped structure, an octopus-shaped structure and raspberry-shaped structure in addition to the spherical-shaped structure. Without departing from the scope of the present invention, the present invention can use particles having at least two structures and compositions.

The emulsifier used in the present invention is not particularly limited. The present invention can use, for example, a nonionic emulsifier and an anionic emulsifier which are generally used in a conventional emulsion polymerization method. Examples of the nonionic emulsifier include a polyoxyethylene alkyl ether, a polyoxyethylene alcohol ether, a polyoxyethylene alkyl phenyl ether, a polyoxyethylene polycyclic phenyl ether, a polyoxyalkylene alkyl ether, a sorbitan fatty acid ester, a polyoxyethylene fatty acid ester, and a polyoxyethylene sorbitan fatty acid ester. Examples of the anionic emulsifier include an alkylbenzene sulfonate salt, an alkyl sulfuric ester salt, a polyoxyethylene alkyl ether sulfate ester salt, and a fatty acid salt. These may be used alone or in combination of at least two. Representative examples of the anionic emulsifier include sodium dodecyl sulfate, sodium dodecylbenzene sulfonate, and lauryl sulfate triethanolamine.

The amount of the emulsifier used in the present invention may be an amount generally used in a conventional emulsion polymerization method. Specifically, the amount of the emulsifier is from 0.01 to 10% by weight, preferably from 0.05 to 5% by weight, more preferably from 0.05 to 3% by weight, based on the amount of the charged monomer.

The polymerization initiator used in the present invention is not particularly limited. The present invention can use a polymerization initiator generally used in a conventional emulsion polymerization method. Examples of the polymerization initiator include a water-soluble polymerization initiator represented by a persulfate salt, such as potassium persulfate, sodium persulfate, and ammonium persulfate; an oil-soluble polymerization initiator represented by cumene hydroperoxide and diisopropylbenzene hydroperoxide; hydroperoxide; an azo initiator such as 4-4'-azobis(4-cyanovaleric acid), 2-2'-azobis[2-(2-imidazoline 2-yl)propane, 2-2'-azobis(propane-2-carboamidine), 2-2'-azobis[N-(2-carboxyethyl)-2-methylpropanamide, 2-2'-azobis{2-[1-(2-hydroxyethyl)-2-imidazoline 2-yl]propane}, 2-2'-azobis(1-imino-1-pyrrolidino isobutane), and 2-2'-azobis{2-methyl-N-[1,1-bis(hydroxymethyl)-2-hydroxyethyl]propanamide}; and a redox initiator. These polymerization initiators may be used alone or in a combination of at least two.

The amount of the polymerization initiator used in the present invention may be an amount generally used in a conventional emulsion polymerization method. Specifically, the amount of the polymerization initiator is from 0.01 to 5% by weight, preferably from 0.05 to 3% by weight, more preferably from 0.1 to 1% by weight, based on the amount of the charged monomer.

Water used for producing the binder of the present invention is not particularly limited, and the present invention can use water generally used. Examples of water include tap water, distilled water, ion exchange water, and ultrapure water. Among them, distilled water, ion exchange water, and ultrapure water are preferable.

In the present invention, a dispersing agent can be used according to necessity, and a type and a use amount are not particularly limited. The present invention can optionally use a conventionally used dispersing agent. Specific examples of the dispersing agent include sodium hexametaphosphate, sodium tripolyphosphate, sodium pyrophosphate, polyacrylic acid or sodium salt thereof, polyethyleneimine, and acrylic acid/maleic acid copolymer and sodium salt thereof.

In the present invention, a chain transfer can be used according to necessity. Examples of the chain transfer agent include an alkyl mercaptan such as n-hexyl mercaptan, n-octyl mercaptan, t-octyl mercaptan, n-dodecyl mercaptan, t-dodecyl mercaptan and n-stearyl mercaptan; 2,4-diphenyl-4-methyl-1-pentene, 2,4-diphenyl-4-methyl-2-pentene; a xanthogen compound such as dimethylxanthogen disulfide and diisopropylxanthogen disulfide; terpinolene, a thiuram compound such as tetramethyl thiuram disulfide, tetraethyl thiuram disulfide, tetramethyl thiuram monosulfide; a phenol compound such as 2,6-di-t-butyl-4-methyl phenol and styrenated phenol; an allyl compound such as allyl alcohol; a halogenated hydrocarbon compound such as dichloromethane, dibromomethane, carbon tetrabromide; a vinyl ether such as α-benzyloxy styrene, α-benzyloxy acrylonitrile and α-benzyloxy acrylamide; triphenyl ethane, pentaphenylethane, acrolein, methacrolein, thioglycolic acid, thiomalic acid, and 2-ethylhexyl thioglycolate. These may be used alone or in combination of at least two. The amount of the chain transfer agent is not particularly limited, and is typically from 0 to 5 parts by weight, based on 100 parts by weight of the charged monomers.

A polymerization time and a polymerization temperature are not particularly limited. The polymerization time and the polymerization temperature can be suitably selected according to, for example, a type of the used polymerization initiator. Generally, the polymerization temperature is from 20° C. to 100° C., and the polymerization time is from 0.5 to 100 hours.

Further, as to the polymer obtained by the above-mentioned method, a pH can be adjusted by optionally using a base as a pH adjuster. Examples of the base include an alkali metal (Li, Na, K, Rb, Cs) hydroxide, ammonia, an inorganic ammonium compound, and an organic amine compound. The range of pH is pH of 1 to 11, preferably pH of 2 to 11, more preferably pH of 2 to 10, for example, pH of 3 to 10, especially pH of 5 to 9.

The binder of the present invention may be generally a binder composition comprising the polymer and water, particularly a binder composition wherein the polymer is dispersed in water. The content (the solid concentration) of the polymer in the binder composition of the present invention is from 0.5% to 80% by weight, preferably from 5% to 70% by weight, more preferably from 10% to 60% by weight.

A particle diameter of the polymer in the binder of the present invention can be measured by, for example, a dynamic light scattering method, a transmission electron microscope method, and an optical microscopy method. The average particle diameter calculated from the dispersion intensity obtained by using the dynamic light scattering method is from 0.001 μm to 1 μm, preferably from 0.001 μm to 0.500 μm. Specific examples of a measurement apparatus include Zetasizer Nano manufactured by Spectris.

Method of Preparing the Slurry for Battery Electrode

The method of preparing the slurry for battery electrode comprising the binder of the present invention is not particularly limited. The binder of the present invention, an active material, an electrically conductive additive, water, and optionally a thickening agent may be dispersed by for example, a stirrer, a dispersion machine, a kneading machine, a planetary ball mill, and a homogenizer used usually. The slurry may be heated in order to increase the efficiency of dispersion, if the slurry material is not affected.

Method of Producing the Electrode for Battery

The method of producing the electrode for battery is not limited, and a general method can be used. For example, a paste (a coating liquid) comprising a positive electrode active material or a negative electrode active material, an electrically conductive additive, the binder, water, and optionally a thickening agent is coated uniformly onto an electrical collector surface by, for example, a doctor blade method or a silk screen method, to give a suitable thickness of the coating.

For example, in the doctor blade method, a slurry prepared by dispersing a negative electrode active material powder or a positive electrode active material powder, an electrically conductive additive, the binder, etc. in water is coated onto a metal electrode substrate, and is equalized into a suitable uniform thickness by a blade having a predetermined slit width. After the active material is coated, the electrode is dried under conditions of, for example, a 100° C. hot blast or a 80° C. vacuum, in order to remove excessive water and organic solvent. The dried electrode is press-treated by a press apparatus to produce the electrode material. After the press-treatment, the electrode may be heat-treated again to remove water, a solvent, an emulsifier, etc.

The positive electrode material comprises, for example, a metal electrode substrate as a substrate for the electrode material; and a positive electrode active material, and a binder for sending and receiving well the ions to and from an electrolyte layer, and fixing the electrically conductive additive and the positive electrode active material onto the metal electrode substrate. Aluminum, for example, is used as the metal electrode substrate. The metal electrode substrate is not limited to aluminum and the metal electrode substrate may be, for example, nickel, stainless steel, gold, platinum or titanium.

The positive electrode active material used in the present invention is a lithium metal-containing composite oxide powder which may be at least one composition selected from $LiMO_2$, $LiM_2O_4$, $Li_2MO_3$ and $LiMEO_4$. In the formulas, M mainly comprises transition metals, and contains at least one selected from Co, Mn, Ni, Cr, Fe and Ti. M comprises a transition metal, and may contain at least one of Al, Ga, Ge, Sn, Pb, Sb, Bi, Si, P and B in addition to the transition metal. E contains at least one selected from P and Si. Preferably, a particle diameter of the positive electrode active material is 50 μm or less, more preferably 20 μm or less. These active materials have an electromotive force of at least 3 V (vs. Li/Li+).

Specific examples of the positive electrode active material include lithium cobalt oxide, lithium nickel oxide, lithium nickel manganese cobalt oxide (three-element system), spinel-type lithium manganese oxide, and iron lithium phosphate.

The negative electrode material comprises, for example, a metal electrode substrate as a substrate for the electrode material; and a negative electrode active material, and a binder for sending and receiving well the ions to and from an electrolyte layer, and fixing the electrically conductive additive and the negative electrode active material onto the metal electrode substrate. Copper, for example, is used as the metal electrode substrate. The metal electrode substrate is not limited to copper and the metal electrode substrate may be, for example, nickel, stainless steel, gold, platinum or titanium.

Examples of the negative electrode active material used in the present invention include a powder comprising a carbon material (for example, natural graphite, artificial graphite, amorphous carbon) which has a structure (a porous structure) capable of intercalating and deintercalating a lithium ion; or a lithium compound, an aluminum compound, a tin compound, a silicon compound, and a titanium compound comprising a metal capable of intercalating and deintercalating a lithium ion. A particle diameter of the negative electrode active material is preferably from 10 nm to 100 μm, more preferably from 20 nm to 20 μm. A mixture active material between a metal and a carbon material may be used. The negative electrode active material preferably has a porosity of about 70%.

Specific examples of the electrically conductive additive include graphite, and an electrically conductive carbon black, such as furnace black, acetylene black, and ketchen black, and a metal powder. The electrically conductive additive may be used alone or a combination of at least two.

Specific examples of the thickening agent include carboxymethyl cellulose, methyl cellulose, hydroxy methyl cellulose, ethyl cellulose, and a sodium salt, ammonium salt, polyvinyl alcohol and polyacrylate salt thereof. The thickening agent may be used alone or a combination of at least two.

The following method of producing the battery is mainly a method of producing a lithium-ion secondary battery.

Method of Producing the Battery

The method of producing the battery, especially the secondary battery is not particularly limited, and be a conventionally know method of producing the battery comprises a positive electrode, a negative electrode, a separator, an electrolyte solution and an electrical collector. For example, in the case of a coin-shaped battery, the positive electrode, the separator and the negative electrode are inserted into an external can. The electrolyte solution is injected into the can and is soaked into electrode. Thereafter, the storage battery is obtained by caulking a sealing cap, a gasket and the can by using, for example, a tab welding. The shape of the battery is not limited and examples of the battery shape include a coin shape, a cylinder shape, and a sheet shape. The battery may have a structure wherein at least two batteries are stacked or laminated.

The separator prevents the positive electrode and the negative electrode from directly contacting and short-circuiting within the storage battery, and a conventionally known material can be used for the separator. Specific examples of the separator include a porous polymer film or a paper, such as a polyolefin. The porous polymer film, such as polyethylene and polypropylene is preferable, since this film is not affected with the electrolyte solution.

The electrolyte solution is a solution which comprises a lithium salt compound for electrolyte and an aprotic organic solvent as a solvent. A lithium salt compound, which is generally used for a lithium-ion battery and which has a wide potential window, is used as the lithium salt compound for electrolyte. Examples of the lithium salt compound include $LiBF_4$, $LiPF_6$, $LiClO_4$, $LiCF_3SO_3$, $LiN(CF_3SO_2)_2$, $LiN(C_2F_5SO_2)_2$ and $LiN[CF_3SC(C_2F_5SO_2)_3]_2$, and the lithium salt compound is not limited to these. These may be used alone or in combination of at least two.

Examples of the aprotic organic solvent include propylene carbonate, ethylene carbonate, dimethyl carbonate, diethyl carbonate, methylethyl carbonate, 1,2-dimethoxyethane, 1,2-diethoxy ethane, gamma-butyrolactone, tetrahydrofuran, 1,3-dioxolane, dipropyl carbonate, diethylether, sulfolane, methylsulfolane, acetonitrile, propylnitrile, anisole, an acetate ester, a propionate ester, and a linear ether such as diethylether, and a combination of at least two may be used.

An ambient-temperature molten salt can be used as the solvent. The ambient-temperature molten salt means a salt, at least part of which exhibits a liquid at an ambient temperature. The ambient temperature means a temperature range assumed that a power source usually operates in said temperature range. The temperature range assumed that a power source usually operates means that the upper limit of the range is about 120° C., optionally about 60° C. and the lower limit is about −40° C., optionally about −20° C.

The ambient-temperature molten salt is also referred to as an ionic liquid, the ambient-temperature molten salt is a "salt" consisting of an ion (an anion and a cation), and, in particular, a liquid compound is referred to as an "ionic liquid".

As a cationic species, known is a quaternary ammonium organic substance cation such as a pyridine-base, a fatty amine-base, and a cycloaliphatic amine-base. Examples of the quaternary ammonium organic substance cation include an imidazolium ion such as dialkyl imidazolium and trialkyl imidazolium, a tetraalkyl ammonium ion, an alkyl pyridinium ion, a pyrazolium ion, a pyrrolidinium ion, and a piperidinium. Particularly, the imidazolium cation is preferable.

Examples of the tetraalkyl ammonium ion include a trimethyl ethyl ammonium ion, a trimethyl ethyl ammonium ion, a trimethyl propyl ammonium ion, a trimethyl hexyl ammonium ion, a tetrapentyl ammonium ion, and a triethyl methyl ammonium ion. The tetraalkyl ammonium ion is not limited to these.

Examples of the alkyl pyridinium ion include a N-methyl pyridinium ion, a N-ethylpyridinium ion, a N-propylpyridinium ion, a N-butyl pyridinium ion, a 1-ethyl-2 methyl-pyridinium ion, a 1-butyl-4-methylpyridinium ion, and a 1-butyl-2,4-dimethylpyridinium ion. The alkyl pyridinium ion is not limited to these.

Examples of the imidazolium cation include a 1,3-dimethyl imidazolium ion, a 1-ethyl-3-methyl imidazolium ion, a 1-methyl-3-ethyl imidazolium ion, a 1-methyl-3-butyl imidazolium ion, a 1-butyl-3-methyl imidazolium ion, a 1,2,3-trimethyl imidazolium ion, a 1,2-dimethyl-3-ethyl imidazolium ion, a 1,2-dimethyl-3-propyl imidazolium ion, and a 1-butyl-2,3-dimethyl imidazolium ion. The imidazolium cation is not limited to these.

Examples of an anion species include a halide ion, such as a chloride ion, a bromide ion and an iodide ion, an inorganic acid ion such as a perchlorate ion, a thiocyanate ion, a tetrafluoroboronate ion, a nitrate ion, $AsF_6^-$ and $PF_6^-$, an organic acid ion such as a stearyl sulfonate ion, an octylsulfonate ion, a dodecylbenzene sulfonate ion, a naphthalene sulfonate ion, a dodecylnaphthalene sulfonate ion, and a 7,7,8,8-tetracyano-p-quinodimethane ion.

The ambient-temperature molten salt may be used alone or in combination of at least two.

Various additive agents can be used for the electrolyte solution according to the necessity. Examples of a flame retardant or a nonflammable agent include a halide, such as a brominated epoxy compound, a phosphazene compound, tetrabromobisphenol A and a chlorinated paraffin, antimony trioxide, antimony pentaoxide, aluminum hydroxide, magnesium hydroxide, a phosphate ester, a polyphosphate, and zinc borate. Examples of a negative electrode surface treatment agent include vinylene carbonate, fluoroethylene carbonate, and polyethylene glycol dimethyl ether. Examples of a positive electrode surface treatment agent include an inorganic compound, such as carbon and a metal oxide (for example, $MgO$ and $ZrO_2$), and an organic compound such as o-terphenyl. Examples of an overcharge inhibitor include biphenyl, and 1-(p-tolyl)-adamantane.

EXAMPLES

Examples are explained below by illustrating specific embodiments for carrying out the present invention. However, the present invention is not limited to the following Examples, without departing from the gist of the present invention.

In the following Examples, electrodes and coin batteries were produced by using the binder of the present invention, and, in the following experiments, a bending test and an adhesion test were conducted for evaluations of the electrode, and a charge/discharge cycle properties test was conducted for evaluations of a coin battery.
Evaluation of Produced Electrode
The bending test and the adhesion test were conducted as evaluation of the produced electrodes. The evaluation results summarized are shown in Tables 1 and 2.
Bending Test
The bending test was conducted by a mandrel bending test. Specifically, the electrode was cut into a piece having a width of 3 cm and a length of 8 cm, and the state of a paint film of a bending portion was observed when the piece was bent at the longitudinal center (at 4 cm portion) position at an angle of 180 degrees around a support of a stainless steel stick having a diameter of 2 mm into a direction of a substrate (so that an electrode surface is outside). The measurement was conducted 5 times by this method. When no crack or peeling of the electrode surface was formed, the evaluation (flexibility) is "Good", and when one or more cracks or peeling of the electrode surface was formed even at one time, the evaluation is "Bad"
Adhesion Test (Bonding Test)
The adhesion test was done by a cross cut test. Specifically, an electrode was snipped into pieces each having a width of 3 cm and a length of 4 cm, and cuts on the piece are made into a right angled lattice pattern with a cutter knife so as to prepare 25 squares (vertically 5 squares×horizontally 5 squares) each having 1 mm side in the pattern. A tape (CELLOTAPE (registered trademark) manufactured by Nichiban) was stuck on the 25 squares. When the tape was peeled off without pausing under the state that the electrode was fixed, the number of the squares, which remained without separating from the electrode, was measured. The test was carried out 5 times to determine an average value.
Evaluation of Produced Battery
The charge/discharge cycle properties test was conducted by using a charging-discharging device, whereby evaluating the produced battery to determine a capacity retention rate. The evaluation results are summarized and shown in Tables 1 and 2.
Capacity Retention Rate
Electrochemical properties, which are charge/discharge cycle properties of the battery, were evaluated with a charging/discharging device manufactured by Nagano & Co., Ltd. by flowing a constant electric current in the battery, at an upper limit of 4.2V and a lower limit of 2.5V under the test condition (C/8) that, at a first time to a 3rd time, a predetermined electrical charge/discharge in 8 hours can be conducted, and the test conditions (C/4) that, at a 4th time or later, a predetermined charge/electric discharge in 4 hours can be conducted. A test temperature was a 60° C. environment. A value of discharge capacity at the 4th cycle was taken as a reversible capacity. The capacity retention rate was evaluated by a ratio of a discharge capacity after conducting the 100 charge/discharge cycles, to a discharge capacity at the 4th cycle.

SYNTHESIS EXAMPLES FOR BINDER COMPOSITION

Synthesis Example 1 for Binder Composition

Into a reaction vessel equipped with an agitator, 55 parts by weight of polypropylene glycol monoacrylate (BLEMMER AP-400, manufactured by NOF Corp.), 35 parts by weight of acrylonitrile, 1.3 parts by weight of acrylic acid, 3.7 parts by weight of methacrylic acid, 5 parts by weight of trimethylolpropane triacrylate (A-TMPT, manufactured by Shin-Nakamura Chemical Co., Ltd), 1 part by weight of sodium dodecyl sulfate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition A1 (Polymerization conversion of at least 99%) (pH of 3.2, Solid content: 18 wt %). The obtained polymer had an average particle diameter of 0.157 micrometers.

Synthesis Example 2 for Binder Composition

Into a reaction vessel equipped with an agitator, 75 parts by weight of polypropylene glycol monoacrylate (BLEMMER AP-400, manufactured by NOF Corp.), 15 parts by weight of acrylonitrile, 1.3 parts by weight of acrylic acid, 3.7 parts by weight of methacrylic acid, 5 parts by weight of pentaerythritol triacrylate (A-TMM-3, manufactured by Shin-Nakamura Chemical Co., Ltd), 1 part by weight of sodium dodecylbenzene sulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After cooling the polymerization liquid, a pH of the polymerization liquid was adjusted to 6.9 from 2.1 with a 24% aqueous solution of sodium hydroxide, to obtain Binder composition B1 (Polymerization conversion of at least 99%) (Solid concentration of 17 wt %). The obtained polymer had an average particle diameter of 0.200 micrometers.

Synthesis Example 3 for Binder Composition

Into a reaction vessel equipped with an agitator, 60 parts by weight of polyethylene glycol monoacrylate (BLEMMER AE-400, manufactured by NOF Corp.), 30 parts by weight of acrylonitrile, 1.3 parts by weight of acrylic acid, 3.7 parts by weight of methacrylic acid, 5 parts by weight of trimethylolpropane triacrylate (A-TMPT, manufactured by Shin-Nakamura Chemical Co., Ltd), 1 part by weight of sodium dodecylbenzene sulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition C1 (Polymerization conversion of at least 99%) (pH of 3.6, Solid content: 17 wt %). The obtained polymer had an average particle diameter of 0.171 micrometers.

Comparative Synthesis Example 1 for Binder Composition

Into a reaction vessel equipped with an agitator, 30 parts by weight of acrylonitrile, 60 parts by weight of methyl methacrylate, 1.3 parts by weight of acrylic acid, 3.7 parts by weight of methacrylic acid, 5 parts by weight of polyethyleneglycol diacrylate, 1 part by weight of sodium dodecylbenzene sulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition D1 (Polymerization conversion of at least 99%) (pH of 3.5, Solid content: 17 wt %).
The obtained polymer had an average particle diameter of 0.123 micrometers.

Comparative Synthesis Example 2 for Binder Composition

Into a reaction vessel equipped with an agitator, 20 parts by weight of acrylonitrile, 55 parts by weight of ethyl acrylate, 20 parts by weight of methyl methacrylate, 1.3 parts by weight of acrylic acid, 3.7 parts by weight of methacrylic acid, 1 part by weight of sodium dodecyl sulfate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition E1 (Polymerization conversion of at least 99%) (pH of 2.8, Solid content of 16 wt %). The obtained polymer had an average particle diameter of 0.131 micrometers.

Synthesis Example 4 for Binder Composition

Into a reaction vessel equipped with an agitator, 55 parts by weight of polypropylene glycol monoacrylate (BLEMMER AP-400, manufactured by NOF Corp.), 35 parts by weight of ethyl acrylate, 5 parts by weight of itaconic acid, 5 parts by weight of pentaerythritol triacrylate (A-TMM-3, manufactured by Shin-Nakamura Chemical Co., Ltd), 1 part by weight of sodium dodecylbenzene sulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition A2 (Polymerization conversion of at least 99%) (pH of 2.1, Solid content of 16 wt %). The obtained polymer had an average particle diameter of 0.108 micrometers.

Synthesis Example 5 for Binder Composition

Into a reaction vessel equipped with an agitator, 45 parts by weight of polypropylene glycol monoacrylate (BLEM- MER AP-400, manufactured by NOF Corp.), 1.3 parts by weight of acrylic acid, 3.7 parts by weight of itaconic acid, 45 parts by weight of methyl methacrylate, 5 parts by weight of trimethylolpropane triacrylate (A-TMPT, manufactured by Shin-Nakamura Chemical Co., Ltd), 1 part by weight of sodium dodecyl sulfate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After cooling the polymerization liquid, a pH of the polymerization liquid was adjusted to 7.1 from 2.5 with a 24% aqueous solution of sodium hydroxide, to obtain Binder composition B2 (Polymerization conversion of at least 99%) (Solid concentration of 16 wt %). The obtained polymer had an average particle diameter of 0.112 micrometers.

Synthesis Example 6 for Binder Composition

Into a reaction vessel equipped with an agitator, 60 parts by weight of polyethylene glycol monoacrylate (BLEMMER AE-400, manufactured by NOF Corp.), 2.6 parts by weight of acrylic acid, 5.4 parts by weight of itaconic acid, 22 parts by weight of ethyl acrylate, 10 parts by weight of trimethylolpropane triacrylate (A-TMPT, manufactured by Shin-Nakamura Chemical Co., Ltd), 1 part by weight of sodium dodecylbenzene sulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition C2 (Polymerization conversion of at least 99%) (pH of 2.5, Solid content: 16 wt %). The obtained polymer had an average particle diameter of 0.115 micrometers.

Comparative Synthesis Example 3 for Binder Composition

Into a reaction vessel equipped with an agitator, 5 parts by weight of itaconic acid, 75 parts by weight of methyl methacrylate, 2.7 parts by weight of acrylic acid, 7.3 parts by weight of methacrylic acid, 10 parts by weight of polyethyleneglycol diacrylate, 1 part by weight of sodium dodecylbenzene sulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition D2 (Polymerization conversion of at least 99%) (pH of 3.3, Solid content: 17 wt %). The obtained polymer had an average particle diameter of 0.119 micrometers.

Comparative Synthesis Example 4 for Binder Composition

Into a reaction vessel equipped with an agitator, 45 parts by weight of ethyl acrylate, 45 parts by weight of methyl methacrylate, 5 parts by weight of itaconic acid, 2.3 parts by weight of acrylic acid, 2.7 parts by weight of methacrylic acid, 1 part by weight of sodium dodecyl sulfate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere. After completion of the polymerization, the polymerization liquid was cooled to obtain Binder composition E2 (Polymerization conversion of at least 99%) (pH of 2.9, Solid content of 17 wt %). The obtained polymer had an average particle diameter of 0.126 micrometers.

PREPARATION EXAMPLES FOR ELECTRODE

Preparation Example 1 for Electrode

To 90.6 parts by weight of lithium nickel manganese cobalt oxide (three-component system) as a positive electrode active material, added were 6.4 parts by weight of acetylene black as an electrically conductive additive, 1 part by weight (solid content) of Binder composition A1 obtained in Synthesis Example 1 for binder, and 2 parts by weight of sodium salt of carboxymethyl cellulose as a thickening agent, and then water as a solvent was added so that a solid content of a slurry for positive electrode was 35% by weight and sufficiently mixed by a planetary mill to obtain the slurry for positive electrode.

The obtained slurry for positive electrode was applied onto an aluminum current collector having a thickness of 20 micrometer by using a die coater having a gap of 150 micrometers and then dried under vacuum at 110° C. for at least 12 hours, pressed with a roller press machine to produce a positive electrode having a thickness of 36 micrometers. The evaluation results of flexibility and bindability are shown in Table 1 for Example 1.

Preparation Example 2 for Electrode

A positive electrode was produced as in Preparation Example 1 for electrode except using Binder composition B1 obtained in Synthesis Example 2 for binder. A thickness of the obtained positive electrode was 34 micrometers. The evaluation results of flexibility and bindability are shown in Table 1 for Example 2.

Preparation Example 3 for Electrode

A positive electrode was produced as in Preparation Example 1 for electrode except using Binder composition C1 obtained in Synthesis Example 3 for binder. A thickness of the obtained positive electrode was 35 micrometers. The evaluation results of flexibility and bindability are shown in Table 1 for Example 3.

Comparative Preparation Example 1 for Electrode

A positive electrode was produced as in Preparation Example 1 for electrode except using Binder composition D1 obtained in Comparative Synthesis Example 1 for binder. A thickness of the obtained positive electrode was 35 micrometers. The evaluation results of flexibility and bindability are shown in Table 1 for Comparative Example 1.

Comparative Preparation Example 2 for Electrode

A positive electrode was produced as in Preparation Example 1 for electrode except using Binder composition E1 obtained in Comparative Synthesis Example 2 for binder. A thickness of the obtained positive electrode was 34 micrometers. The evaluation results of flexibility and bindability are shown in Table 1 for Comparative Example 2.

Comparative Preparation Example 3 for Electrode

To 88.7 parts by weight of lithium nickel manganese cobalt oxide (three-component system) as a positive electrode active material, added were 6.3 parts by weight of acetylene black as an electrically conductive additive, 5 parts by weight (solid content) of polyvinylidene fluoride (PVDF, a solution having a solid concentration of 12 wt % in N-methyl-2-pyrrolidone) as a binder, and then N-methyl-2-pyrrolidone as a solvent was added so that a solid content of a slurry for positive electrode was 40% by weight and sufficiently mixed by a planetary mill to obtain the slurry for positive electrode.

A positive electrode was produced as in Preparation Example 1 for electrode except using the thus obtained slurry. A thickness of the obtained positive electrode was 36 micrometers. The evaluation results of flexibility and bindability are shown in Table 1 for Comparative Example 3.

Preparation Example 4 for Electrode

To 90.6 parts by weight of lithium nickel manganese cobalt oxide (three-component system) as a positive electrode active material, added were 6.4 parts by weight of acetylene black as an electrically conductive additive, 1 part by weight (solid content) of Binder composition A2 obtained in Synthesis Example 4 for binder, and 2 parts by weight of sodium salt of carboxymethyl cellulose as a thickening agent, and then water as a solvent was added so that a solid content of a slurry for positive electrode was 35% by weight and sufficiently mixed by a planetary mill to obtain the slurry for positive electrode.

The obtained slurry for positive electrode was applied onto an aluminum current collector having a thickness of 20 micrometer by using a die coater having a gap of 150 micrometers and then dried under vacuum at 110° C. for at least 12 hours, pressed with a roller press machine to produce a positive electrode having a thickness of 34 micrometers. The evaluation results of flexibility and bindability are shown in Table 2 for Example 4.

Preparation Example 5 for Electrode

A positive electrode was produced as in Preparation Example 4 for electrode except using Binder composition B2 obtained in Synthesis Example 5 for binder. A thickness of the obtained positive electrode was 35 micrometers. The evaluation results of flexibility and bindability are shown in Table 2 for Example 5.

Preparation Example 6 for Electrode

A positive electrode was produced as in Preparation Example 4 for electrode except using Binder composition C2 obtained in Synthesis Example 6 for binder. A thickness of the obtained positive electrode was 35 micrometers. The evaluation results of flexibility and bindability are shown in Table 2 for Example 6.

Comparative Preparation Example 4 for Electrode

A positive electrode was produced as in Preparation Example 4 for electrode except using Binder composition D2 obtained in Comparative Synthesis Example 3 for binder. A thickness of the obtained positive electrode was 36 micrometers. The evaluation results of flexibility and bindability are shown in Table 2 for Comparative Example 4.

Comparative Preparation Example 5 for Electrode

A positive electrode was produced as in Preparation Example 4 for electrode except using Binder composition E2 obtained in Comparative Synthesis Example 4 for binder. A thickness of the obtained positive electrode was 36 micrometers. The evaluation results of flexibility and bindability are shown in Table 2 for Comparative Example 2.

Comparative Preparation Example 6 for Electrode

To 88.7 parts by weight of lithium nickel manganese cobalt oxide (three-component system) as a positive electrode active material, added were 6.3 parts by weight of acetylene black as an electrically conductive additive, 5 parts by weight (solid content) of polyvinylidene fluoride (PVDF, a solution having a solid concentration of 12 wt % in N-methyl-2-pyrrolidone) as a binder, and then N-methyl-2-pyrrolidone as a solvent was added so that a solid content of a slurry for positive electrode was 40% by weight and sufficiently mixed by a planetary mill to obtain the slurry for positive electrode.

A positive electrode was produced as in Preparation Example 4 for electrode except using the thus obtained slurry. A thickness of the obtained positive electrode was 35 micrometers. The evaluation results of flexibility and bindability are shown in Table 2 for Comparative Example 6.

PRODUCTION EXAMPLES FOR COIN BATTERY

Production Example 1 for Coin Battery

In a glove box substituted with an argon gas, a laminate prepared by bonding the positive electrode obtained in Preparation Example 1 for electrode, two porous films of polypropylene/polyethylene/polypropylene each having a thickness of 18 μm as a separator, and a metal lithium foil having a thickness of 300 μm as a counter electrode was fully impregnated with 1 mol/L solution of lithium hexafluorophosphate in ethylene carbonate and dimethyl carbonate (volume ratio 1:1) as an electrolyte solution, then caulked to produce a 2032 type coin battery. Results of determining the capacity retention rate after 100 cycles are shown in Table 1 for Example 1.

Production Example 2 for Coin Battery

The coin battery was produced as in Production Example 1 for coin battery except using the positive electrode obtained in Preparation Example 2 for electrode. Results of determining the capacity retention rate after 100 cycles are shown in Table 1 for Example 2.

Production Example 3 for Coin Battery

The coin battery was produced as in Production Example 1 for coin battery except using the positive electrode obtained in Preparation Example 3 for electrode. Results of determining the capacity retention rate after 100 cycles are shown in Table 1 for Example 3.

Comparative Production Example 1 for Coin Battery

The coin battery was produced as in Production Example 1 for coin battery except using the positive electrode obtained in Comparative Preparation Example 1 for electrode. Results of determining the capacity retention rate after 100 cycles are shown in Table 1 for Comparative Example 1.

Comparative Production Example 2 for Coin Battery

The coin battery was produced as in Production Example 1 for coin battery except using the positive electrode obtained in Comparative Preparation Example 2 for electrode. Results of determining the capacity retention rate after 100 cycles are shown in Table 1 for Comparative Example 2.

Comparative Production Example 3 for Coin Battery

The coin battery was produced as in Production Example 1 for coin battery except using the positive electrode obtained in Comparative Preparation Example 3 for electrode. Results of determining the capacity retention rate after 100 cycles are shown in Table 1 for Comparative Example 3.

Examples and Comparative Examples are shown in Table 1.

TABLE 1

|  | Ex. 1 | Ex. 2 | Ex. 3 | Com. Ex. 1 | Com. Ex. 2 | Com. Ex. 3 |
|---|---|---|---|---|---|---|
| Binder composition | A1 | B1 | C1 | D1 | E1 | PVDF |
| Flexibility of electrode | Good | Good | Good | Bad | Good | Good |
| Adhesion of electrode | 25/25 | 25/25 | 25/25 | 9/25 | 13/25 | 5/25 |
| Capacity retention rate (%) (60° C.) | 93 | 95 | 90 | 74 | 82 | 78 |

Production Example 4 for Coin Battery

In a glove box substituted with an argon gas, a laminate prepared by bonding the positive electrode obtained in Preparation Example 4 for electrode, two porous films of polypropylene/polyethylene/polypropylene each having a thickness of 18 μm as a separator, and a metal lithium foil having a thickness of 300 μm as a counter electrode was fully impregnated with 1 mol/L solution of lithium hexafluorophosphate in ethylene carbonate and dimethyl carbonate (volume ratio 1:1) as an electrolyte solution, then caulked to produce a 2032 type coin battery for test. Results of determining the capacity retention rate after 100 cycles are shown in Table 2 for Example 4.

Production Example 5 for Coin Battery

The coin battery was produced as in Production Example 4 for coin battery except using the positive electrode obtained in Preparation Example 5 for electrode. Results of determining the capacity retention rate after 100 cycles are shown in Table 2 for Example 5.

Production Example 6 for Coin Battery

The coin battery was produced as in Production Example 4 for coin battery except using the positive electrode obtained in Preparation Example 6 for electrode. Results of determining the capacity retention rate after 100 cycles are shown in Table 2 for Example 6.

Comparative Production Example 4 for Coin Battery

The coin battery was produced as in Production Example 4 for coin battery except using the positive electrode obtained in Comparative Preparation Example 4 for electrode. Results of determining the capacity retention rate after 100 cycles are shown in Table 2 for Comparative Example 4.

Comparative Production Example 5 for Coin Battery

The coin battery was produced as in Production Example 4 for coin battery except using the positive electrode obtained in Comparative Preparation Example 5 for electrode. Results of determining the capacity retention rate after 100 cycles are shown in Table 2 for Comparative Example 5.

Comparative Production Example 6 for Coin Battery

The coin battery was produced as in Production Example 4 for coin battery except using the positive electrode obtained in Comparative Preparation Example 6 for electrode. Results of determining the capacity retention rate after 100 cycles are shown in Table 2 for Comparative Example 6.

Examples and Comparative Examples are shown in Table 2.

TABLE 2

|  | Ex. 4 | Ex. 5 | Ex. 6 | Com. Ex. 4 | Com. Ex. 5 | Com. Ex. 6 |
|---|---|---|---|---|---|---|
| Binder composition | A2 | B2 | C2 | D2 | E2 | PVDF |
| Flexibility of electrode | Good | Good | Good | Bad | Good | Good |
| Adhesion of an electrode | 25/25 | 25/25 | 25/25 | 13/25 | 21/25 | 5/25 |
| Capacity retention rate (%) (60° C.) | 96 | 97 | 93 | 88 | 82 | 78 |

INDUSTRIAL APPLICABILITY

The binder for secondary lithium battery of the present invention has the advantages that the binder has high binding strength, the binder is in a water system giving a small environmental load, and performances are not influenced by a temperature. Accordingly, the secondary lithium-ion battery, comprising the present binder, can be suitably used as a secondary (rechargeable) battery ranging from small-scale batteries, such as electronic devices, e.g., cell phones, laptop computers and camcorders, to large-scale lithium-ion batteries such as storage batteries for house applications for power storage and automotive applications such as electric vehicles and hybrid electric vehicles.

The invention claimed is:
1. A binder for battery electrode, comprising a polymer comprising:
   1 to 89.9% by weight of (A) constitutional units derived from a monomer having a hydroxyl group, of the formula (1):

$$\text{H}_2\text{C}=\overset{\text{R}^1}{\underset{}{\text{C}}}-\overset{\text{O}}{\underset{}{\text{C}}}-\text{O}-\left(\overset{\text{R}^2}{\underset{\text{H}}{\text{C}}}-\overset{\text{R}^3}{\underset{\text{H}}{\text{C}}}-\text{O}\right)_n\!\!-\text{H} \quad (1)$$

wherein $R^1$ is hydrogen, or a linear or branched alkyl group having 1 to 4 carbon atoms,
$R^2$ and $R^3$ each is hydrogen, or a linear or branched alkyl group having 1 to 4 carbon atoms, and
n is an integer of 2 to 30,
40 to 10% by weight of (B) constitutional units derived from an ethylenically unsaturated monomer having at least one functional group selected from the group consisting of a difunctional carboxylic acid group, a nitrile group and a ketone group, and
20 to 0.1% by weight of (C) constitutional units derived from a polyfunctional (meth)acrylate monomer having penta- or less functionality.

2. The binder for battery electrode according to claim 1, wherein n is an integer of 4 to 20, in the formula (1).

3. The binder for battery electrode according to claim 1, wherein the functional group-containing ethylenically unsaturated monomer (B) is a compound of the formula (2):

$$(A^1-)(A^2-)C=C(-A^3)(-A^4) \quad (2)$$

wherein $A^1$ is a group having a nitrile group (—CN group), a carboxylic acid group (—COOH group) or a ketone group (>C=O group),
$A^2$ and $A^3$ are each independently a hydrogen atom, a halogen atom, an alkyl group having 1-6 carbon atoms, or a group having a nitrile group (—CN group) or a carboxylic acid group (—COOH group),
$A^4$ is a hydrogen atom, a halogen atom, or an alkyl group having 1-6 carbon atoms, and
$A^1$ and $A^2$, or $A^1$ and $A^3$ may be joined together to form a cyclic hydrocarbon group having two carboxylic acid groups.

4. The binder for battery electrode according to claim 1, wherein the group having a nitrile group (—CN group) is a —$B^2$—CN group wherein $B^2$ is a direct bond or an alkylene group having 1-6 carbon atoms,
the group having a difunctional carboxylic acid group (—COOH group) (dicarboxylic acid group) is a —$B^1$—COOH group wherein $B^1$ is a direct bond or an alkylene group having 1-6 carbon atoms, and
the group having a ketone group (>C=O group) is a —$B^3$—CO—$B^4$ group wherein $B^3$ is a direct bond or an alkylene group having 1-6 carbon atoms, and $B^4$ is an alkyl group having 1-6 carbon atoms.

5. The binder for battery electrode according to claim 1, wherein the ethylenically unsaturated monomer having a nitrile group (—CN group) is a compound of the formula:

$$(CN-)(X^{11}-)C=C(-X^{12})(-X^{13})$$

wherein $X^{11}$ is a hydrogen atom, an alkyl group having 1-6 carbon atoms, a halogen atom or a cyano group,
$X^{12}$ is a hydrogen atom, an alkyl group having 1-6 carbon atoms or a cyano group, and
$X^{13}$ is a hydrogen atom, an alkyl group having 1-6 carbon atoms or a halogen atom.

6. The binder for battery electrode according to claim 1, wherein the ethylenically unsaturated monomer having a difunctional carboxylic acid group is a compound of the formula:

$$(HOOC-X^{21}-)(HOOC-X^{22}-)_m(-X^{23})_{1-m}C=C(-X^{22}-COOH)_{1-m}(-X^{23})_m(-X^{24})$$

wherein $X^{21}$ and $X^{22}$ are each independently a direct bond or an alkylene group having 1-6 carbon atoms,
$X^{23}$ and $X^{24}$ are each independently a hydrogen atom, an alkyl group having 1-6 carbon atoms or a halogen atom, and
m is 0 or 1.

7. The binder for battery electrode according to claim 1, wherein the ethylenically unsaturated monomer having a ketone group is a compound of the formula:

$$(X^{31}-CO-X^{32}-)(X^{33}-)C=C(-X^{34})(-X^{35})$$

wherein $X^{31}$, $X^{33}$, $X^{34}$ and $X^{35}$ are each independently a hydrogen atom, an alkyl group having 1-6 carbon atoms or a halogen atom, and
$X^{32}$ is a direct bond or an alkylene group having 1-6 carbon atoms.

8. The binder for battery electrode according to claim 1, wherein the polyfunctional (meth)acrylate monomer (C) is a compound of the formula (3):

$$(CH_2=\overset{R^{11}}{\underset{}{C}}-COO\!\!-\!)_m R^{12} \quad (3)$$

wherein $R^{11}$ is independently hydrogen or a methyl group,
$R^{12}$ is a penta- or less valent organic group having 2 to 100 carbon atoms, and
m is an integer less than or equal to 5.

9. The binder for battery electrode according to claim 1, wherein the polyfunctional (meth)acrylate (C) is a (meth)acrylate having tri-functionality to penta-functionality.

10. The binder for battery electrodes according to claim 1, wherein the polymer further comprises one or both of constitutional units (D) derived from a (meth)acrylate ester monomer and constitutional units (E) derived from a (meth)acrylic acid monomer.

11. The binder for battery electrode according to claim 10, wherein the (meth)acrylate ester monomer (D) is a compound of the formula (4):

$$CH_2=\overset{R^{21}}{\underset{}{C}}-COOR^{22} \quad (4)$$

wherein $R^{21}$ is hydrogen or a methyl group, and
$R^{22}$ is a hydrocarbon group having 1 to 50 carbon atoms.

12. The binder for battery electrode according to claim 10, wherein the (meth)acrylic acid monomer (E) is a compound of the formula (5):

$$CH_2=\overset{R^{31}}{\underset{}{C}}-COOH \quad (5)$$

wherein $R^{31}$ is hydrogen or a methyl group.

13. The binder for battery electrode according to claim 1, wherein the battery is a secondary battery.

14. A battery electrode comprising the binder according to claim 1, and an active material.

15. A battery comprising the electrode according to claim 14.

* * * * *